US011153252B1

(12) United States Patent
Dhumal et al.

(10) Patent No.: US 11,153,252 B1
(45) Date of Patent: Oct. 19, 2021

(54) COMMUNICATION MAILBOX AVAILABILITY NOTIFICATION

(71) Applicant: Avaya Management L.P., Durham, NC (US)

(72) Inventors: Pragati Dhumal, Pune (IN); Tanvi Sharma, Pune (IN); Navanath Navaskar, Pune (IN)

(73) Assignee: Avaya Management L.P., Santa Clara, CA (US)

( * ) Notice: Subject to any disclaimer, the term of this patent is extended or adjusted under 35 U.S.C. 154(b) by 0 days.

(21) Appl. No.: 17/105,165

(22) Filed: Nov. 25, 2020

(51) Int. Cl.
*G06F 15/16* (2006.01)
*H04L 12/58* (2006.01)

(52) U.S. Cl.
CPC .............. *H04L 51/30* (2013.01); *H04L 51/22* (2013.01); *H04L 51/32* (2013.01)

(58) Field of Classification Search
CPC .......... H04L 51/30; H04L 51/22; H04L 51/32
USPC .................................. 709/206, 203, 207, 217
See application file for complete search history.

(56) References Cited

U.S. PATENT DOCUMENTS

| | | | | |
|---|---|---|---|---|
| 6,556,666 B1 * | 4/2003 | Beyda | ...................... | H04M 1/65 379/211.03 |
| 6,839,737 B1 * | 1/2005 | Friskel | ................. | G06Q 10/107 707/999.01 |
| 7,023,974 B1 * | 4/2006 | Brannam | ................. | H03M 7/30 379/88.17 |
| 8,667,069 B1 * | 3/2014 | Connelly | ................ | H04L 51/32 709/206 |
| 2003/0120733 A1 * | 6/2003 | Forman | ................... | H04L 51/28 709/206 |
| 2004/0059790 A1 * | 3/2004 | Austin-Lane | ........... | H04L 51/04 709/207 |
| 2010/0087215 A1 * | 4/2010 | Gu | ........................ | H04L 51/066 455/466 |
| 2012/0158867 A1 * | 6/2012 | Levow | .................... | H04L 51/30 709/206 |
| 2012/0331081 A1 * | 12/2012 | Roic | .................... | G06Q 10/107 709/206 |
| 2014/0074623 A1 * | 3/2014 | Mohammadi | ...... | G06Q 30/0269 705/14.66 |
| 2019/0173828 A1 * | 6/2019 | Yegnashankaran | ......................... | H04L 29/08936 |

* cited by examiner

*Primary Examiner* — Kaylee J Huang
(74) *Attorney, Agent, or Firm* — Sheridan Ross P.C.

(57) ABSTRACT

A method for notifying a sender of a communication message that a communication mailbox of a recipient is available includes determining a status of the communication mailbox of the recipient, wherein the status includes an available status or an unavailable status. The method also includes receiving an indication that the communication message from the sender was undeliverable to the communication mailbox of the recipient when the status of the communication mailbox of the recipient is in the unavailable status. Moreover, the method includes sending a notification to the sender when the status of the communication mailbox of the recipient changes from the unavailable status to the available status.

19 Claims, 6 Drawing Sheets

COMMUNICATION MAILBOX AVAILABILITY NOTIFICATION

FIELD OF THE DISCLOSURE

The disclosure relates generally to systems and methods for message communication and particularly to systems and methods for communication mailbox availability notification.

BACKGROUND

In message communication systems such as email message communication systems, email messages are typically generated by users on communication devices such as a Personal Computer (PC) for example, and once an email message from a user has been generated, it is forwarded to an email delivery server which hosts the users' email accounts. The email delivery server temporarily stores the email messages in a queue for processing and sending to a recipient or destination email mailbox via an email destination server at which the recipient email mailbox is hosted.

Once the email destination server receives the email message, the email destination server stores the email message in the recipient email mailbox. Sometimes, however, problems arise during the email delivery process such as the recipient email mailbox being full, in which case the email destination server is unable to store new email messages in the recipient email mailbox. In such cases, the email destination server will typically generate an error message, which is returned to the email delivery server to indicate that the email message has not been delivered. In emergency situations, it is difficult for the user (e.g., the sender of the email message) to know when to retry sending the email message given that the sender has no idea when the recipient email mailbox would become available to receive new email messages. Therefore, the sender might constantly try resending the email message without knowing if the email message will be accepted by the email destination server.

SUMMARY

These and other needs are addressed by the various embodiments and configurations of the present disclosure. The present disclosure can provide a number of advantages depending on the particular configuration. These and other advantages will be apparent from the disclosure of the disclosure(s) contained herein. In one embodiment, a method for notifying a sender of a communication message that a communication mailbox of a recipient is available is disclosed that includes determining a status of the communication mailbox of the recipient. The status includes an available status or an unavailable status. The method also includes receiving an indication that the communication message from the sender was undeliverable to the communication mailbox of the recipient when the status of the communication mailbox of the recipient is in the unavailable status. The method further includes sending a notification to the sender when the status of the communication mailbox of the recipient changes from the unavailable status to the available status.

The phrases "at least one," "one or more," "or," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B, and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such as a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

The term "means" as used herein shall be given its broadest possible interpretation in accordance with 35 U.S.C., Section 112(1) and/or Section 112, Paragraph 6.

Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The preceding is a simplified summary of the disclosure to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below. Also, while the disclosure is presented in terms of exemplary embodiments, it should be appreciated that an individual aspect of the disclosure can be separately claimed.

BRIEF DESCRIPTION OF THE DRAWINGS

The present disclosure is described in conjunction with the appended figures.

DETAILED DESCRIPTION

The ensuing description provides embodiments only and is not intended to limit the scope, applicability, or configuration of the claims. Rather, the ensuing description will provide those skilled in the art with an enabling description for implementing the embodiments. It will be understood that various changes may be made in the function and arrangement of elements without departing from the spirit and scope of the appended claims.

Any reference in the description comprising an element number, without a sub element identifier when a sub element identifier exists in the figures, when used in the plural, is intended to reference any two or more elements with a like element number. When such a reference is made in the singular form, it is intended to reference one of the elements with the like element number without limitation to a specific one of the elements. Any explicit usage herein to the contrary or providing further qualification or identification shall take precedence.

The exemplary systems and methods of this disclosure will also be described in relation to analysis software, modules, and associated analysis hardware. However, to avoid unnecessarily obscuring the present disclosure, the following description omits well-known structures, components, and devices, which may be omitted from or shown in a simplified form in the figures or otherwise summarized.

For purposes of explanation, numerous details are set forth in order to provide a thorough understanding of the present disclosure. It should be appreciated, however, that the present disclosure may be practiced in a variety of ways beyond the specific details set forth herein.

In some embodiments of the present disclosure, an existing message communication system, such as an email message communication system for example, continues to be employed for email message delivery, augmented with a notification system, that is for example, overlaid on the email message communication system. The notification system may enable a sender of an email message to a recipient to be notified when the recipient is able to receive new email messages after receiving an indication the email message was undeliverable to the mailbox of the recipient.

Figure 1:
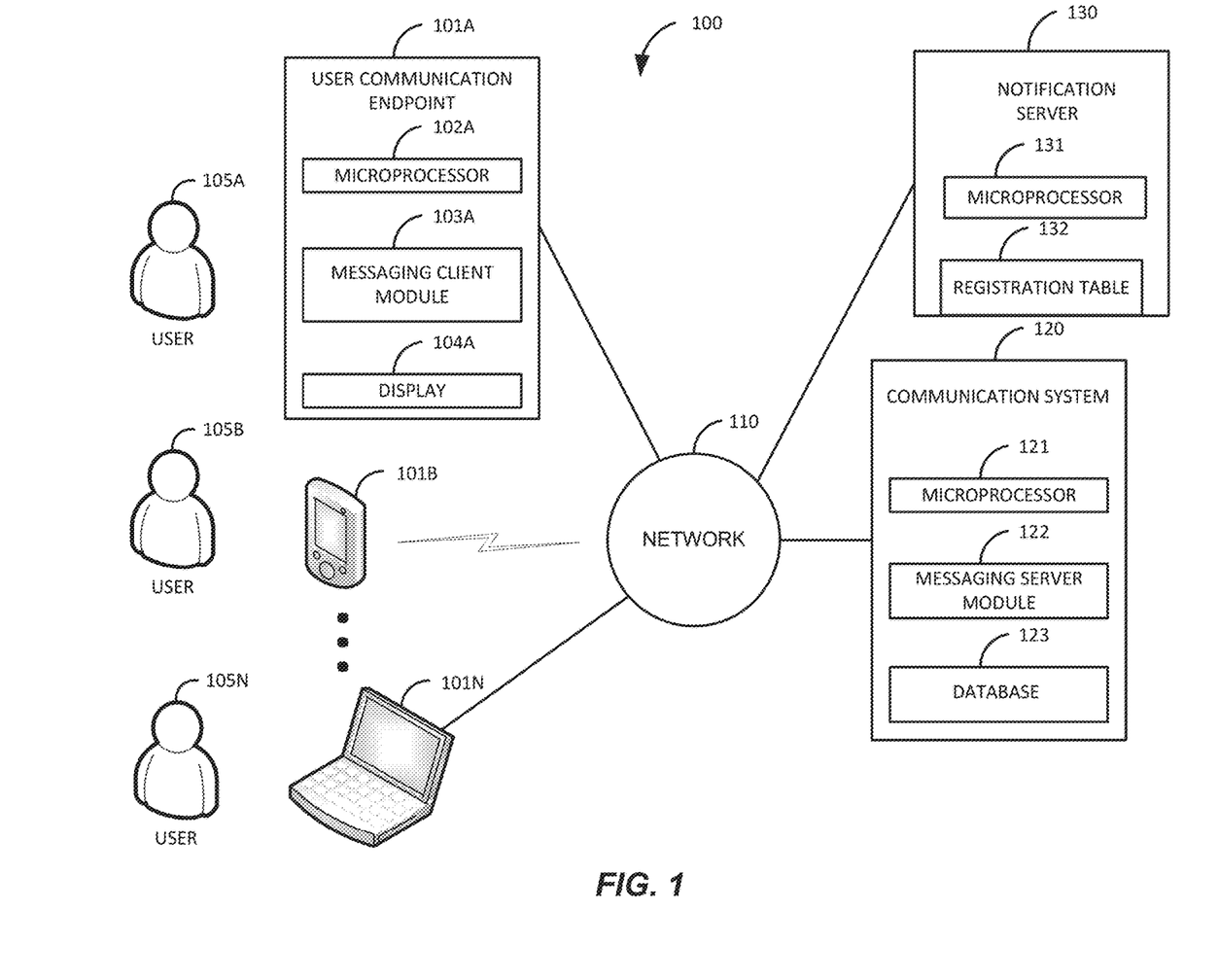
FIG. 1 is a block diagram of a first illustrative system for communication mailbox availability notification according to an embodiment of the present disclosure.

FIG. 1 is a block diagram of a first illustrative system 100 for communication mailbox availability notification according to an embodiment of the present disclosure. The first illustrative system 100 includes user communication endpoints 101A-101N, network 110, communication system 120 and notification server 130. In addition, users 105A-105N are shown being associated with user communication endpoints 101A-101N, respectively. User communication endpoints 101A-101N can be or may include any user communication endpoint device that can communicate on network 110, such as a Personal Computer (PC), a telephone, a video system, a cellular telephone, a Personal Digital Assistant (PDA), a tablet device, a notebook device, a smartphone, and/or the like. User communication endpoints 101A-101N are devices where a communication session ends. User communication endpoints 101A-101N are not network elements that facilitate and/or relay information in the network, such as a communication manager or router. As shown in FIG. 1, any number of user communication endpoints 101A-101N may be connected to network 110. User communication endpoint 101A further includes microprocessor 102A, messaging client module 103A and display 104A.

Microprocessor 102A can be or may include any hardware processor, such as a micro-controller, an application specific processor, a multi-core processor, a digital signaling processor, and/or the like. According to one embodiment of the present disclosure, messaging client module 103A can be or may include any client that can be used to send messages such as a text message (e.g., a Short Message Service (SMS)) and/or an email message. Messaging client module 103A can send text messages and/or email messages to messaging server module 122 via network 110. Display 104A can be or may include any hardware display that can display information to user 105A. For example, display 104A may be a Light Emitting Diode (LED) display, a plasma display, a liquid crystal display, a cathode ray tube, a projector, and/or the like.

Although only user communication endpoint 101A is illustrated and described in detail above, each of the user communication endpoints 101B-101N includes the same features as user communication endpoint 101A-101N illustrated and described above and therefore their illustration and description has been omitted.

Network 110 can be or may include any collection of communication equipment that can send and receive electronic communications, such as the Internet, a Wide Area Network (WAN), a Local Area Network (LAN), a Voice over IP Network (VoIP), the Public Switched Telephone Network (PSTN), a packet switched network, a circuit switched network, a cellular network, a combination of these, and the like. Network 110 can use a variety of electronic protocols, such as Ethernet, Internet Protocol (IP), Session Initiation Protocol (SIP), Integrated Services Digital Network (ISDN), email protocols, text messaging protocols (e.g., Short Message Service (SMS)), and/or the like. Thus, network 110 is an electronic communication network configured to carry messages via packets and/or circuit switched communications.

Communication system 120 can be or may include any hardware coupled with software that can manage how communication messages such as for example, text messages, email messages, voice mail messages, etc. are routed between the user communication endpoints 101A-101N. Communication system 120 includes microprocessor 121, messaging server module 122 and database 123. Microprocessor 121 can be or may include any hardware processor, such as a micro-controller, an application specific processor, a multi-core processor, a digital signaling processor, and/or the like. Messaging server module 122 can be or may include any software that can manage how communication messages are routed between the user communication endpoints 101A-101N. Database 123 can be any storage medium that includes information such as for example, customer or subscriber information.

Notification server 130 can be or may include any hardware coupled with software that can communicate with communication system 120, to enable a sender of a communication message to a recipient, at or in communication with communication system 120, to be notified when the recipient is able to receive new email messages. A notification is sent to the sender after the sender receives a response to a previous email message indicating the previous email message was undeliverable to the communication mailbox of the recipient. Notification server 130 includes microprocessor 131 and registration table 132. Microprocessor 131 can be or may include any hardware processor, such as a micro-controller, an application specific processor, a multi-core processor, a digital signaling processor, and/or the like. Registration table 132 includes information regarding subscribers that have registered with the notification system. As discussed in greater detail below, subscribers include users registered to be notified when a communication mailbox of a recipient subscriber becomes available as well as users having their communication mailbox registered with the notification system. According to one alternative embodiment of the present disclosure, notification server 130 may be incorporated within communication system 120 without departing from the spirit and scope of the present disclosure.

Figure 2:
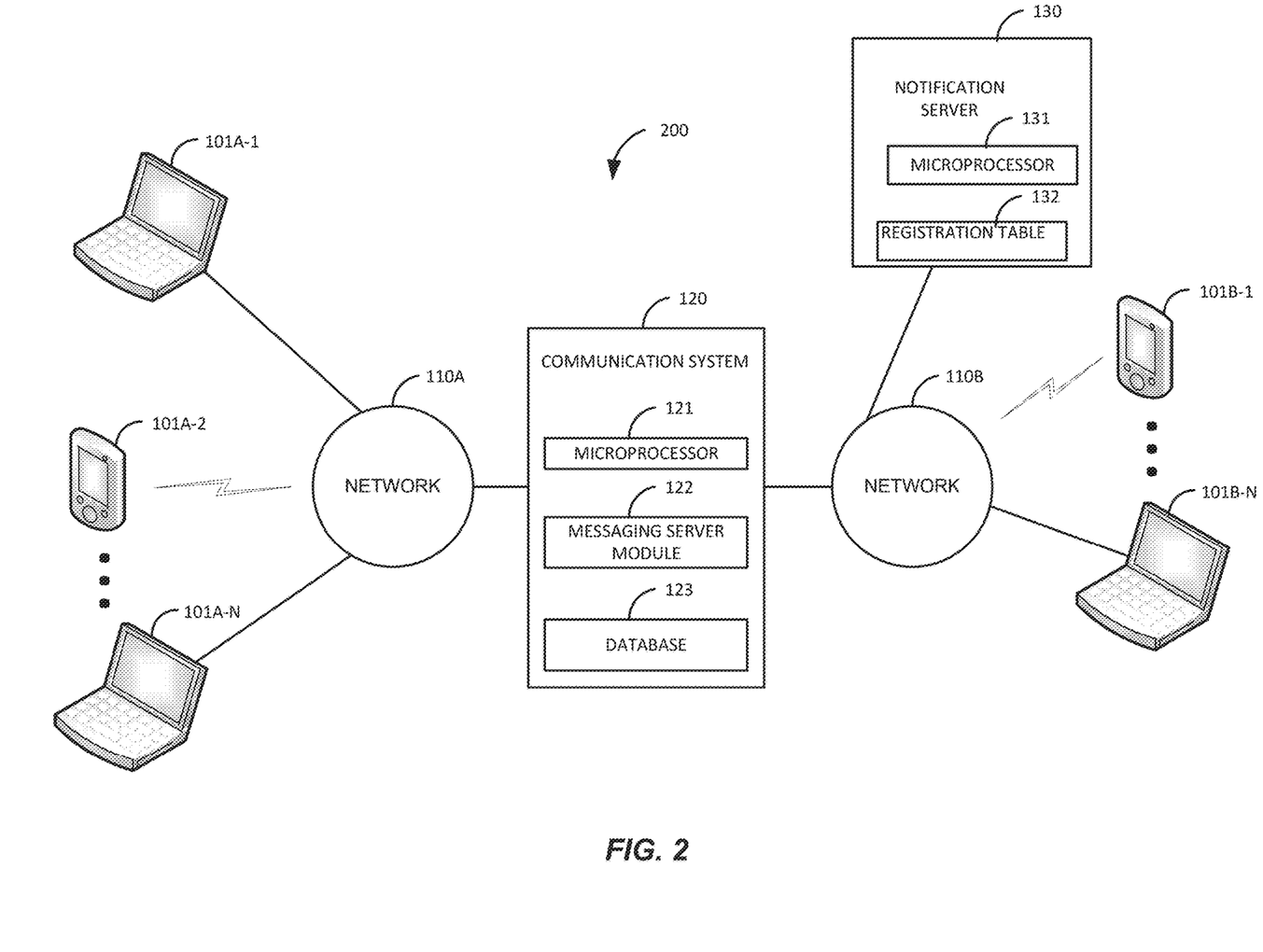
FIG. 2 is a block diagram of a second illustrative system for communication mailbox availability notification according to an alternative embodiment of the present disclosure.

FIG. 2 is a block diagram of a second illustrative system 200 for communication mailbox availability notification according to an alternative embodiment of the present disclosure. The second illustrative system 200 includes user communication endpoints 101A-1-101A-N, 101B-1-101B-N, networks 110A-110B, communication system 120 and notification server 130. In FIG. 2, network 110A is typically a public network, such as the Internet. Network 110B is typically a private network, such as, a corporate network. In FIG. 2, communication system 120 is typically used to send communication messages between user communication endpoints 101A-1-101A-N and user communication endpoints 101B-1-101B-N. Notification server 130 communicates with communication system 120 to notify users at user communication endpoints 101A-1-101A-N when mailboxes for users at user communication endpoints 101B-1-101B-N become available. Alternatively, notification server 130 can communicate with communication system 120 to notify users at communication end points 101B-1-101B-N when mailboxes for users at user communication endpoints 101A-1-101A-N become available. Again, notification server 130 may be incorporated within communication system 120 without departing from the spirit and scope of the present disclosure.

Figure 3:
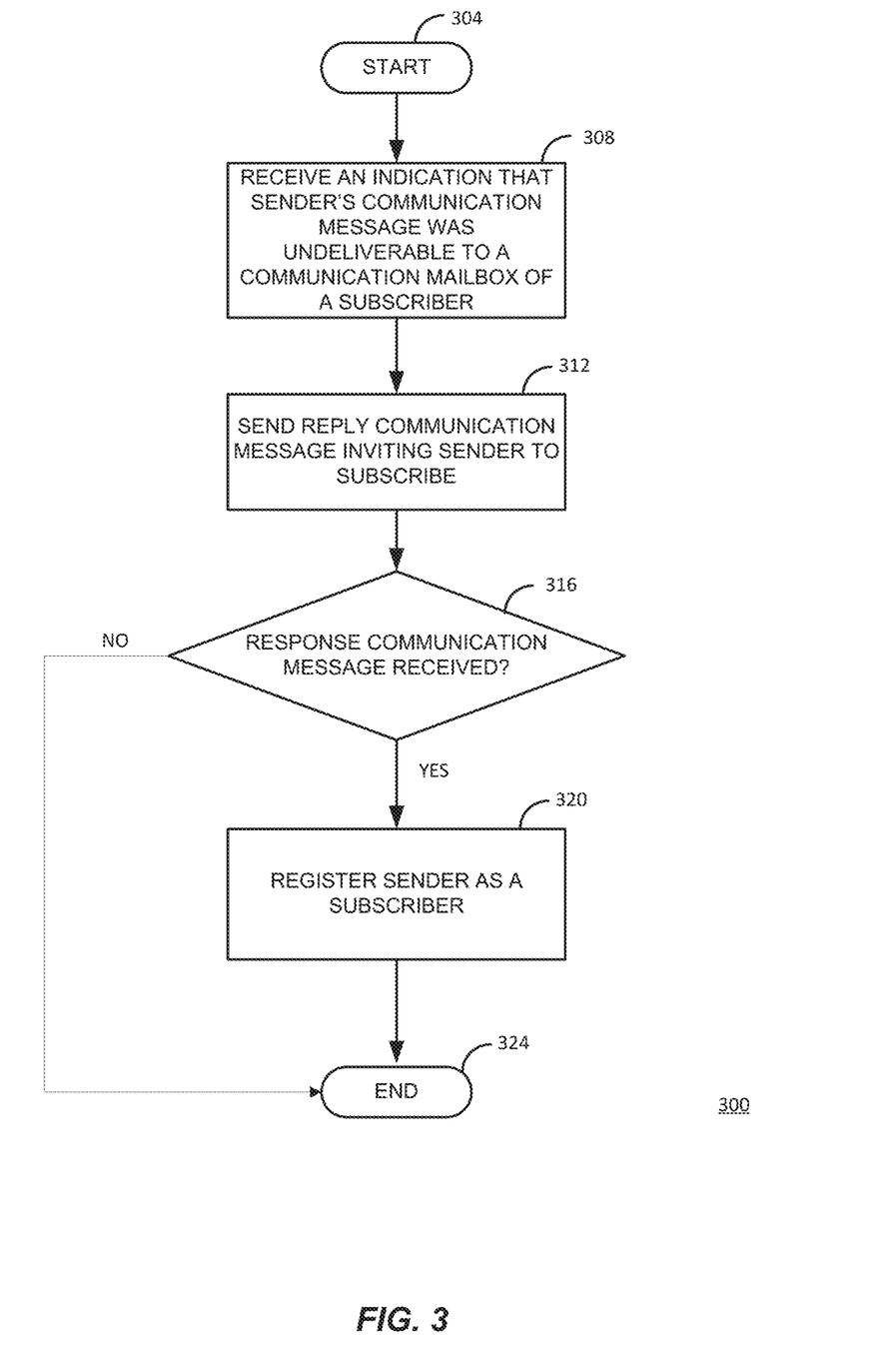
FIG. 3 is a flow diagram of a method for inviting users to subscribe to a communication mailbox availability notification service according to an embodiment of the present disclosure.

FIG. 3 is a flow diagram of a method 300 for inviting users to subscribe to a communication mailbox availability notification service according to an embodiment of the present disclosure. While a general order of the steps of method 300 is shown in FIG. 3, method 300 can include more or fewer steps or can arrange the order of the steps differently than those shown in FIG. 3. Further, two or more steps may be combined into one step. Generally, method 300 starts with a START operation at step 304 and ends with an END operation at 324. Method 300 can be executed as a set of computer-executable instructions executed by a data-processing system and encoded or stored on a computer readable medium. Hereinafter, method 300 shall be explained with reference to systems, components, modules, software, data structures, user interfaces, etc. described in conjunction with FIGS. 1, 2, 4 and 5.

Method 300 may begin at step 304 and proceed to step 308, where microprocessor 131 of notification server 130 receives from messaging server module 122 of communication system 120, an indication that a communication message was undeliverable to the communication mailbox of a recipient subscriber. According to one embodiment of the present disclosure, microprocessor 131 receives the indication from messaging server module 122 by periodically polling the communication mailbox status of subscribers to the communication mailbox availability notification service. As used herein, undeliverable means the recipient's mailbox is full or the email destination server is down. After receiving the indication that a communication message was undeliverable at step 308, method 300 proceeds to step 312, where the microprocessor 131 communicates with messaging server module 122 to send a reply communication message inviting the sender of the communication message to subscribe to the communication mailbox availability notification service. After sending the reply communication message inviting the sender to subscribe to the communication mailbox availability notification service at step 312, method 300 proceeds to decision step 316, where microprocessor 131 communicates with communication system 120 to determine if a response communication message is received from the sender. If no response communication message or a negative response message is received from the sender (NO) in decision step 316, method 300 ends at END operation 324. If a positive response communication message is received from the sender (YES) in decision step 316, method 300 proceeds to step 320 where microprocessor 131 registers the sender as a subscriber to the communication mailbox availability notification service. After registering the sender as a subscriber to the communication mailbox availability notification service at step 320, method 300 ends at END operation 324.

Figure 4:
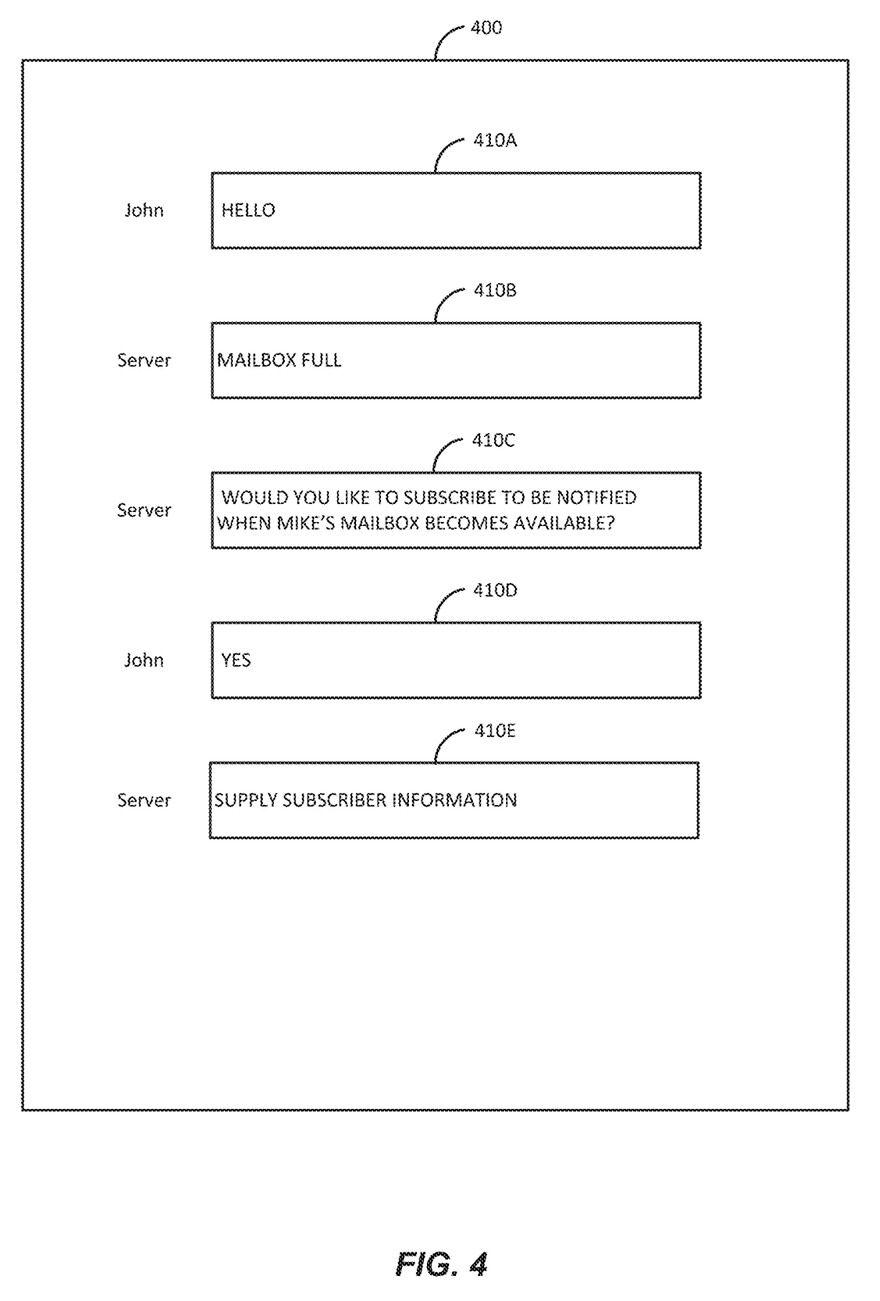
FIG. 4 is a diagram of a user interface that depicts a series of communication messages for inviting users to subscribe to the communication mailbox availability notification service as outlined in FIG. 3 according to an embodiment of the present disclosure.

FIG. 4 is a diagram of a user interface that depicts a series of communication messages for inviting users to subscribe to the communication mailbox availability notification service as outlined in FIG. 3 according to an embodiment of the present disclosure. Illustratively, user communication endpoints 101A-101N, 101A-1-101A-N, and 101B-1-101B-N, messaging client module 103A, communication system 120, messaging server module 122, notification server 130, and registration table 132 are stored-program-controlled entities, such as a computer or microprocessor 102A/121/131, which performs the method of FIG. 3 and the processes described herein by executing program instructions stored in a computer readable storage medium, such as a memory (i.e., a computer memory, a hard disk, and/or the like).

User interface 400 is displayed in the display 104A to the user 105A. The user interface 400 depicts a series of communication messages 410A-410E. However, as one of skill in the art would recognize, the communication messages 410A-410E may also be a series of text messages, email messages, video messages, voice messages, social media messages or instant messages. The communication messages 410A-410E of FIG. 4 are described in relation to FIGS. 1 and 2. In FIG. 4, user 105A is John. John sends, using the messaging client module 103A of user communication endpoint 101A-1, a communication message 410A to user 105B (Mike) via the network 110 and the messaging server module 122. For example, John sends the communication message 410A that states "HELLO." Communication message 410A is never seen by Mike because Mike's communication mailbox is unavailable.

Messaging server module 122 sends John a reply communication message 410B indicating that Mike's communication mailbox is unavailable. For example, messaging server module 122 sends a communication message 410B that states "MAILBOX FULL." Before, after or at the same time as communication message 410B is sent to John, notification server 130 determines the status of Mike's communication mailbox. The status includes an available status or an unavailable status. If the status of Mike's communication mailbox is unavailable and the reply communication message 410B has been sent to John, notification server 130 in communication with messaging server module 122 sends communication message 410C to John. For example, messaging server module 122 sends communication message 410C that states "WOULD YOU LIKE TO SUBSCRIBE TO BE NOTIFIED WHEN MIKE'S MAILBOX BECOMES AVAILABLE?" In response to communication 410C, John may respond with communication message 410D which states "YES."

John may also decline the offer by not responding to communication message 410C or by responding to communication message 410C in a negative manner at which point the communication messages may end. After John accepts the offer by stating YES or similar language in communication message 410D, notification server 130 communicating with messaging server module 122 sends John communication message 410E which asks John to "SUPPLY SUBSCRIBER INFORMATION." Subscriber information may include, but is not limited to, confirmation of John's email address used for the current communication session, alternative email addresses, a telephone number, an instant message account, a social media account or other contact information to inform John when Mike's communication mailbox is available to receive communication messages.

Figure 5:
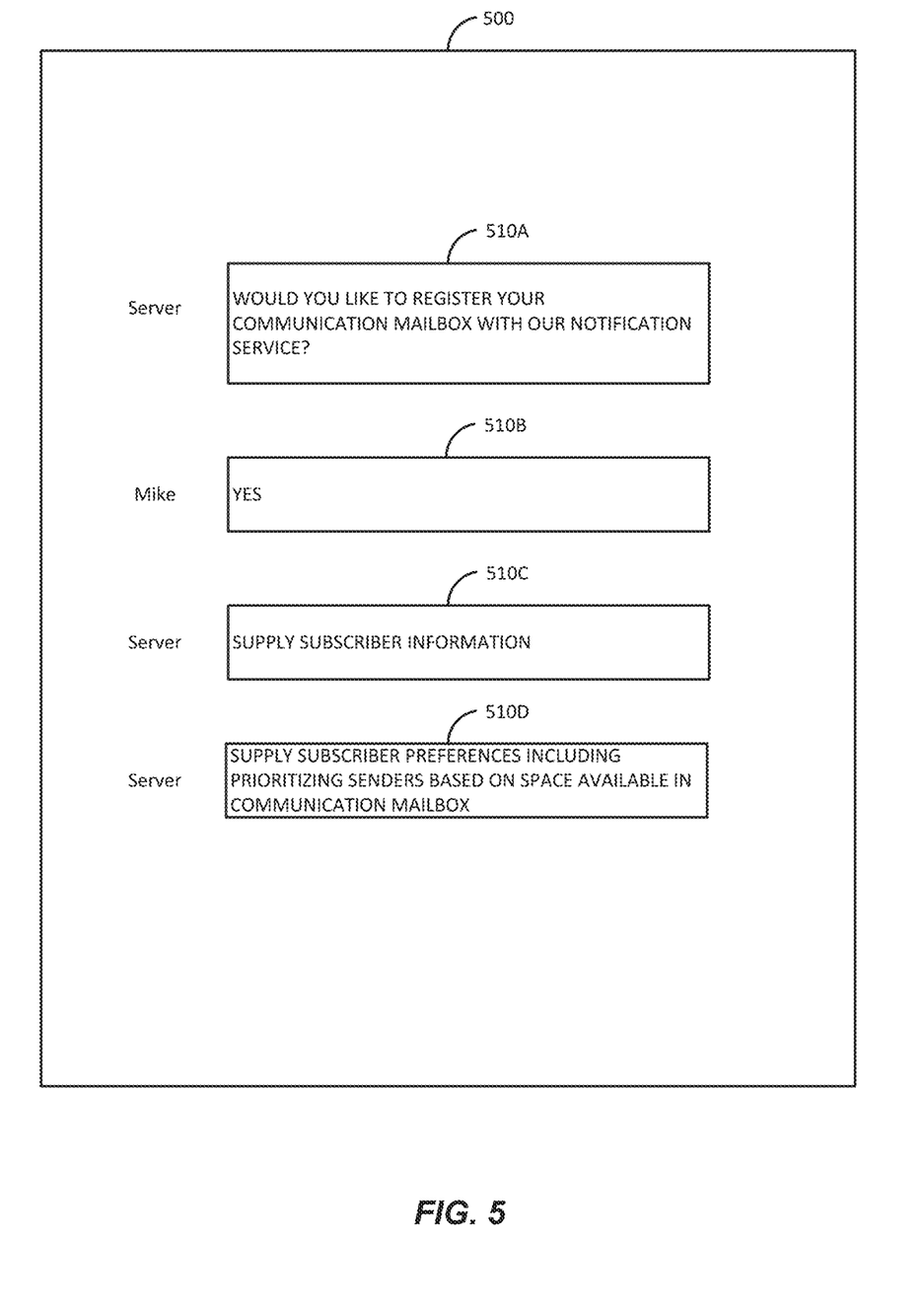
FIG. 5 is a diagram of a user interface that depicts a series of communication messages for inviting users to subscribe by registering a communication mailbox with the communication mailbox availability notification service according to an embodiment of the present disclosure.

FIG. 5 is a diagram of a user interface that depicts a series of communication messages for inviting users to subscribe by registering a communication mailbox with the communication mailbox availability notification service according to an embodiment of the present disclosure. The user interface 500 is displayed in the display 104B to the user 105B. The user interface 500 depicts a series of communication messages 510A-510D. However, as one of skill in the art would recognize, the communication messages 510A-510D may also be a series of text messages, email messages, video messages, voice messages, social media messages or instant messages. The communication messages 510A-510D of FIG. 5 are described in relation to FIGS. 1 and 2.

In FIG. 5, user 105B is Mike. Mike, using the messaging client module 103B of user communication endpoint 101B-1 receives a communication message from notification server 130 via messaging server module 122. Communication message 510A states "WOULD YOU LIKE TO REGISTER YOUR COMMUNICATION MAILBOX WITH OUR NOTIFICATION SERVICE?" In response to communication 510A, Mike may respond with communication message 510B which states "YES." Mike also may decline the offer by not responding to communication message 510A or by responding to communication message 510A in a negative manner at which point the communication messages may end. After Mike accepts the offer by stating "YES" or similar language in communication message 510B, notification server 130 communicating with messaging server module 122 sends Mike communication message 510C which asks Mike to "SUPPLY SUBSCRIBER INFORMATION." Subscriber information may include, but is not limited to, confirmation of Mike's email address used for the current communication session, alternative email addresses, a telephone number, an instant message account, a social media account or other contact information to communicate with Mike. Alternative contact information is required in order to be able to contact Mike when one or more of Mike's communication mailboxes are unavailable. The notification server 130 may contact Mike to ask Mike to delete some of the communication messages in his communication mailbox since Mike's communication mailbox is full and can no longer receive communication messages.

After receiving Mike's subscriber information, notification server 130 communicating with messaging server module 122 sends Mike communication message 510D which asks Mike to "SUPPLY SUBSCRIBER PREFERENCES." Subscriber preferences may include, but are not limited to, names of subscribers that Mike would not like to be notified when Mike's communication mailbox becomes available (e.g., a blacklist), a ranking (prioritizing) subscribers registered to be notified when Mike's communication mailbox becomes available based on the space available in Mike's communication mailbox, etc.

As stated above and as further described below, notification server 130 provides several services to recipient subscribers and sender subscribers such as: (1) notifying a sender subscriber that a recipient subscriber's communication mailbox is able to accept communication messages after the recipient subscriber's communication mailbox was unable to accept communication messages; (2) notifying a recipient subscriber that the recipient subscriber's communication mailbox is unable to accept communication messages; (3) monitoring the recipient subscriber's communication mailbox for the sender subscriber, the recipient subscriber or both to determine when the recipient subscriber's communication mailbox is able to accept communication messages; (4) providing options to the recipient subscriber to determine which of a plurality of sender subscribers will have access to the recipient subscriber's communication mailbox when the recipient subscriber's communication mailbox becomes available to receive communication messages; and/or (5) providing options to the recipient subscriber to determine when a sender subscriber will have access to the recipient subscriber's communication mailbox when the recipient subscriber's communication mailbox becomes available to receive communication messages.

Regarding (1) notifying a sender subscriber that a recipient subscriber's communication mailbox is able to accept communication messages after the recipient subscriber's communication mailbox was unavailable to accept communication messages, the sender subscriber would first have to register for the services provided by the notification server. According to an embodiment of the present disclosure, when a sender sends a communication message to the recipient subscriber's communication mailbox and the communication mailbox is unavailable (the communication mailbox is full or inoperable, etc.) the notification server communicates with the communication system to determine the status of the recipient subscriber's communication mailbox. The communication mailbox being unavailable includes at least one of the communication mailbox being full, a user account associated with the communication mailbox being out-of-service and the user account associated with the communication mailbox being blocked. According to one embodiment of the present disclosure, the notification server periodically monitors the recipient subscriber's communication mailbox to determine the status of the recipient subscriber's communication mailbox (available or unavailable). Alternatively, the notification server determines the status of the recipient subscriber's communication mailbox based on the communication system notifying the notification server that the recipient subscriber's communication mailbox is unavailable.

Regarding (2) notifying a recipient subscriber that the recipient subscriber's communication mailbox is unavailable to receive communication messages, the notification server notifies the recipient subscriber by an alternative form of communication previously provided by the recipient subscriber during a registration process of the notification service. Alternative forms of communication include, but are not limited to a call, an instant message such as an SMS, a pop-up message to the recipient subscriber mobile device, etc. The recipient subscriber has the option of deleting some of the communication messages such that the recipient subscriber's communication mailbox is available to receive communication messages. The recipient subscriber also has the option of deleting some of the communication messages such that the recipient subscriber's communication mailbox is available and sending a return communication message to a sender subscriber that the recipient subscriber's communication mailbox is available to receive communication messages. Alternatively, the recipient subscriber also has the option of deleting some of the communication messages such that the recipient subscriber's communication mailbox is available and waiting for the notification server to notify the sender subscriber that the recipient subscriber's communication mailbox is available.

Regarding (3) monitoring the recipient subscriber's communication mailbox for the sender subscriber, the recipient subscriber or both to determine when the recipient subscriber's communication mailbox is available to accept communication messages, includes monitoring and providing periodic communication message updates to the sender subscriber as to the status of the recipient subscriber's communication mailbox. The communication message updates not only include whether the recipient subscriber's communication mailbox is available or unavailable, but also includes how much space is available in the recipient subscriber's communication mailbox to receive messages. According to one embodiment of the present disclosure, notification to the sender subscriber is provided by algorithm (s) provided in memory of the notification server such as Last In, First Out (LIFO) or First In, First Out (FIFO) can be used to determine when and which one of the sender subscribers to notify when the recipient subscriber's communication mailbox becomes available. Recipient subscriber has the option of not only selecting which sender subscriber receives notification as to the status of the recipient subscriber's communication mailbox, but also has the option of prioritizing the sender subscribers.

Regarding (4) providing options to the recipient subscriber to determine which of a plurality of sender subscribers will have access to the recipient subscriber's communication mailbox when the recipient subscriber's communication mailbox becomes available to receive communication messages, during the registration process, the recipient subscriber selects which sender subscriber will be notified when the recipient subscriber's communication mailbox becomes available to receive communication messages. For senders of communication messages that have not registered with the notification service, the notification server offers the recipient subscriber the option to block certain email addresses that may be unfamiliar or harmful to the recipient subscriber. Harmful email addresses may be for example SPAM messages. According to an alternative embodiment of the present disclosure, SPAM messages may be identified by the communication system and forwarded to the notification server for further evaluation.

Regarding (5) providing options to the recipient subscriber to determine when a sender subscriber will have access to the recipient subscriber's communication mailbox when the recipient subscriber's communication mailbox becomes available to receive communication messages, the notification server provides the recipient subscriber with the option to prioritize a list of sender subscribers to notify the sender subscribers based on the prioritized list. For example, if a recipient subscriber's communication mailbox is full with 1000 spaces, but 300 spaces become available, the list of sender subscribers will be notified of the availability of the recipient subscriber's communication mailbox, based on where they are ranked in the list of sender subscribers. The sender subscribers on the list of subscribers are notified until the remaining spaces (300) are used and the recipient subscriber's communication mailbox becomes unavailable.

Figure 6:
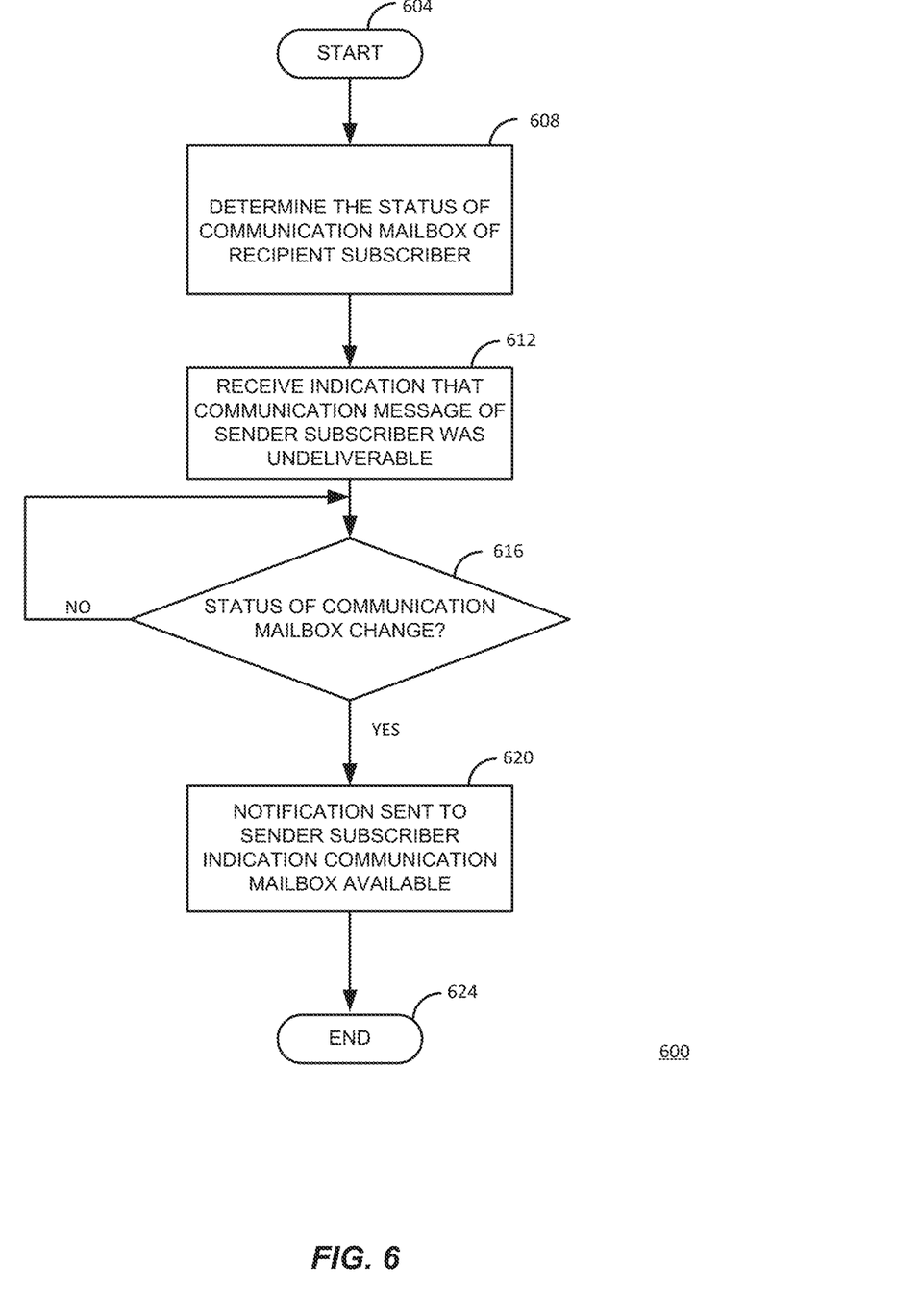
FIG. 6 is a flow diagram of a method for communication mailbox availability notification according to an embodiment of the present disclosure.

FIG. 6 is a flow diagram of a method for communication mailbox availability notification according to an embodiment of the present disclosure. While a general order of the steps of method 600 is shown in FIG. 6, method 600 can include more or fewer steps or can arrange the order of the steps differently than those shown in FIG. 6. Further, two or more steps may be combined into one step. Generally, method 600 starts with a START operation at step 604 and ends with an END operation at 624. Method 600 can be executed as a set of computer-executable instructions executed by a data-processing system and encoded or stored on a computer readable medium. Hereinafter, method 600 shall be explained with reference to systems, components, modules, software, data structures, user interfaces, etc. described in conjunction with FIGS. 1, 2, 4 and 5.

Method 600 may begin at step 604 and proceed to step 608, where microprocessor 131 of notification server 130 receives from messaging server module 122 of communication system 120 the status of the communication mailbox of a recipient subscriber. According to an alternative embodiment of the present disclosure, the status of the communication mailbox of the recipient subscriber may be pre-stored in registration table 132. The pre-stored information may be the result of the notification server 130 periodically polling database 123 of communication system 120. After the status of the communication mailbox of the recipient subscriber has been received at step 608, method 600 proceeds to step 612, where the notification server 130 receives an indication that a communication message for a sender subscriber was undeliverable to the communication mailbox of the recipient subscriber. After receiving the indication that the communication message of the sender subscriber was undeliverable at step 612, method 600 proceeds to decision step 616, where the microprocessor 131 communicates with messaging server module 122 to determine if the communication mailbox of the recipient subscriber is available. If the recipient subscriber's communication mailbox is available (YES) at decision step 616, method 600 proceeds to step 620 where a notification to the sender subscriber is sent indicating the communication mailbox of the recipient subscriber is available. After sending the notification to the sender subscriber that the communication mailbox of the recipient subscriber is available at step 620, method 600 ends at END operation 624. If the recipient subscriber's communication mailbox is not available (NO) at decision step 616, method 600 repeats decision step 616.

In the foregoing description, for the purposes of illustration, methods were described in a particular order. It should be appreciated that in alternate embodiments, the methods may be performed in a different order than that described without departing from the scope of the embodiments. It should also be appreciated that the methods described above may be performed as algorithms executed by hardware components (e.g., circuitry) purpose-built to carry out one or more algorithms or portions thereof described herein. In another embodiment, the hardware component may comprise a general-purpose microprocessor (e.g., CPU, GPU) that is first converted to a special-purpose microprocessor. The special-purpose microprocessor then having had loaded therein encoded signals causing the, now special-purpose, microprocessor to maintain machine-readable instructions to enable the microprocessor to read and execute the machine-readable set of instructions derived from the algorithms and/or other instructions described herein. The machine-readable instructions utilized to execute the algorithm(s), or portions thereof, are not unlimited but utilize a finite set of instructions known to the microprocessor. The machine-readable instructions may be encoded in the microprocessor as signals or values in signal-producing components and included, in one or more embodiments, voltages in memory circuits, configuration of switching circuits, and/or by selective use of particular logic gate circuits. Additionally, or alternative, the machine-readable instructions may be accessible to the microprocessor and encoded in a media or device as magnetic fields, voltage values, charge values, reflective/non-reflective portions, and/or physical indicia.

In another embodiment, the microprocessor further comprises one or more of a single microprocessor, a multi-core processor, a plurality of microprocessors, a distributed processing system (e.g., array(s), blade(s), server farm(s), "cloud", multi-purpose processor array(s), cluster(s), etc.) and/or may be co-located with a microprocessor performing other processing operations. Any one or more microprocessor may be integrated into a single processing appliance (e.g., computer, server, blade, etc.) or located entirely or in part in a discrete component connected via a communications link (e.g., bus, network, backplane, etc. or a plurality thereof).

Examples of general-purpose microprocessors may comprise, a central processing unit (CPU) with data values encoded in an instruction register (or other circuitry maintaining instructions) or data values comprising memory locations, which in turn comprise values utilized as instructions. The memory locations may further comprise a memory location that is external to the CPU. Such CPU-external components may be embodied as one or more of a field-programmable gate array (FPGA), read-only memory (ROM), programmable read-only memory (PROM), erasable programmable read-only memory (EPROM), random access memory (RAM), bus-accessible storage, network-accessible storage, etc.

These machine-executable instructions may be stored on one or more machine-readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

In another embodiment, a microprocessor may be a system or collection of processing hardware components, such as a microprocessor on a client device and a microprocessor on a server, a collection of devices with their respective microprocessor, or a shared or remote processing service (e.g., "cloud" based microprocessor). A system of microprocessors may comprise task-specific allocation of processing tasks and/or shared or distributed processing tasks. In yet another embodiment, a microprocessor may execute software to provide the services to emulate a different microprocessor or microprocessors. As a result, first microprocessor, comprised of a first set of hardware components, may virtually provide the services of a second microprocessor whereby the hardware associated with the first microprocessor may operate using an instruction set associated with the second microprocessor.

While machine-executable instructions may be stored and executed locally to a particular machine (e.g., personal computer, mobile computing device, laptop, etc.), it should be appreciated that the storage of data and/or instructions and/or the execution of at least a portion of the instructions may be provided via connectivity to a remote data storage and/or processing device or collection of devices, commonly known as "the cloud," but may include a public, private, dedicated, shared and/or other service bureau, computing service, and/or "server farm."

Examples of the microprocessors as described herein may include, but are not limited to, at least one of Qualcomm® Snapdragon® 800 and 801, Qualcomm® Snapdragon® 610 and 615 with 4G LTE Integration and 64-bit computing, Apple® A7 microprocessor with 64-bit architecture, Apple® M7 motion comicroprocessors, Samsung® Exynos® series, the Intel® Core™ family of microprocessors, the Intel® Xeon® family of microprocessors, the Intel® Atom™ family of microprocessors, the Intel Itanium® family of microprocessors, Intel® Core® i5-4670K and i7-4770K 22 nm Haswell, Intel® Core® i5-3570K 22 nm Ivy Bridge, the AMD® FX™ family of microprocessors, AMD® FX-4300, FX-6300, and FX-8350 32 nm Vishera, AMD® Kaveri microprocessors, Texas Instruments® Jacinto C6000™ automotive infotainment microprocessors, Texas Instruments® OMAP™ automotive-grade mobile microprocessors, ARM® Cortex™-M microprocessors, ARM® Cortex-A and ARM926EJ-S™ microprocessors, other industry-equivalent microprocessors, and may perform computational functions using any known or future-developed standard, instruction set, libraries, and/or architecture.

Any of the steps, functions, and operations discussed herein can be performed continuously and automatically.

The exemplary systems and methods of this disclosure have been described in relation to communications systems and components and methods for monitoring, enhancing, and embellishing communications and messages. However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should, however, be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components or portions thereof (e.g., microprocessors, memory/storage, interfaces, etc.) of the system can be combined into one or more devices, such as a server, servers, computer, computing device, terminal, "cloud" or other distributed processing, or collocated on a particular node of a distributed network, such as an analog and/or digital telecommunications network, a packet-switched network, or a circuit-switched network. In another embodiment, the components may be physical or logically distributed across a plurality of components (e.g., a microprocessor may comprise a first microprocessor on one component and a second microprocessor on another component, each performing a portion of a shared task and/or an allocated task). It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosure.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal microprocessor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include microprocessors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Embodiments herein comprising software are executed, or stored for subsequent execution, by one or more microprocessors and are executed as executable code. The executable code being selected to execute instructions that comprise the particular embodiment. The instructions executed being a constrained set of instructions selected from the discrete set of native instructions understood by the microprocessor and, prior to execution, committed to microprocessor-accessible memory. In another embodiment, human-readable "source code" software, prior to execution by the one or more microprocessors, is first converted to system software to comprise a platform (e.g., computer, microprocessor, database, etc.) specific set of instructions selected from the platform's native instruction set.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the present disclosure after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and\or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

What is claimed is:

1. A method for notifying a sender of a communication message that a communication mailbox of a recipient is available, comprising:
   determining a status of the communication mailbox of the recipient, wherein the status includes an available status or an unavailable status based on a capacity of the communication mailbox of the recipient to receive communication messages;
   receiving an indication that the communication message from the sender was undeliverable to the communication mailbox of the recipient when the status of the communication mailbox is in the unavailable status;
   sending a first notification to the sender when the status of the communication mailbox of the recipient changes from the unavailable status to the available status indicating that the communication mailbox of the recipient has the capacity to receive the communication messages; and
   offering the sender an opportunity to subscribe to being notified when the status of the communication mailbox of the recipient changes from the unavailable status to the available status, after receiving the indication that the communication message was undeliverable to the communication mailbox of the recipient.

2. The method according to claim 1, further comprising sending a second notification to the recipient that the communication message was undeliverable to the communication mailbox of the recipient.

3. The method according to claim 2, further comprising sending the second notification to the recipient using a different message format than the communication message.

4. The method according to claim 1, further comprising sending the first notification to the sender using a same message format as the communication message.

5. The method according to claim 4, wherein the same message format is one of a text message, a video message, a voice message, an email message, a social media message or an instant message.

6. The method according to claim 1, further comprising sending the first notification to the sender using a different message format than the communication message.

7. The method according to claim 6, wherein the different message format is one of a text message, a video message, a voice message, an email message, a social media message or an instant message.

8. The method according to claim 7, wherein the different message format for the first notification to the sender is obtained from the sender via a registration process.

9. The method according to claim 1, further comprising sending a second notification to the recipient as to the status of the communication mailbox of the recipient.

10. The method according to claim 9, further comprising sending the second notification to the recipient using a different message format than the communication message.

11. The method according to claim 10, wherein the different message format is one of a text message, a video message, a voice message, an email message, a social media message or an instant message.

12. The method according to claim 1, wherein the unavailable status includes at least one of the communication mailbox being full, a user account associated with the communication mailbox being out-of-service and the user account associated with the communication mailbox being blocked.

13. The method according to claim 1, further comprising sending the first notification to the sender when the status of the communication mailbox of the recipient changes from the unavailable status to the available status after receiving approval of the sender from the recipient.

14. The method according to claim 1, further comprising sending the first notification to the sender when the status of the communication mailbox of the recipient changes from the unavailable status to the available status based on a priority of a plurality of senders.

15. A system for notifying a sender of a communication message that a communication mailbox of a recipient is available, comprising:
- a memory; and
- at least one processor, coupled to the memory, operative to:
  - determine a status of the communication mailbox of the recipient, wherein the status includes an available status or an unavailable status based on a capacity of the communication mailbox of the recipient to be able to receive communication messages;
  - receive an indication that the communication message from the sender was undeliverable to the communication mailbox of the recipient when the status of the communication mailbox of the recipient is in the unavailable status;
  - send a first notification to the sender when the status of the communication mailbox of the recipient changes from the unavailable status to the available status indicating that the communication mailbox of the recipient has the capacity to receive the communication messages; and
  - offer the sender an opportunity to subscribe to being notified when the status of the communication mailbox of the recipient changes from the unavailable status to the available status, after receiving the indication that the communication message was undeliverable to the communication mailbox of the recipient.

16. The system according to claim 15, wherein the at least one processor is operative to send a second notification to the recipient that the communication message was undeliverable to the communication mailbox of the recipient.

17. The system according to claim 16, wherein the at least one processor is operative to send the second notification to the recipient using a different message format than the communication message.

18. The system according to claim 15, wherein the at least one processor is operative to send the first notification to the sender using a different message format than the communication message.

19. A non-transitory computer-readable storage medium having instructions stored thereon that, in response to execution, cause a processor to perform operations comprising:
- determining a status of a communication mailbox of a recipient, wherein the status includes an available status or an unavailable status based on a capacity of the communication mailbox of the recipient to receive communication messages;
- receiving an indication that a communication message from a sender was undeliverable to the communication mailbox of the recipient when the status of the communication mailbox of the recipient is in the unavailable status;
- sending a first notification to the sender when the status of the communication mailbox of the recipient changes from the unavailable status to the available status indicating that the communication mailbox of the recipient has a capacity to receive the communication messages; and
- offering the sender an opportunity to subscribe to being notified when the status of the communication mailbox of the recipient changes from the unavailable status to the available status, after receiving the indication that the communication message was undeliverable to the communication mailbox of the recipient.

* * * * *